(12) United States Patent
Eadon et al.

(10) Patent No.: US 8,617,293 B2
(45) Date of Patent: Dec. 31, 2013

(54) MEMBRANES SUITABLE FOR GAS SEPARATION, AND RELATED ARTICLES AND PROCESSES

(75) Inventors: Geoffrey Mark Eadon, Milton, NY (US); Anthony Yu-Chung Ku, Rexford, NY (US); Vidya Ramaswamy, Nishkayuna, NY (US)

(73) Assignee: General Electric Company, Niskayuna, NY (US)

( * ) Notice: Subject to any disclaimer, the term of this patent is extended or adjusted under 35 U.S.C. 154(b) by 1147 days.

(21) Appl. No.: 12/538,268

(22) Filed: Aug. 10, 2009

(65) Prior Publication Data

US 2011/0030382 A1 Feb. 10, 2011

(51) Int. Cl.
| | |
|---|---|
| *B01D 53/22* | (2006.01) |
| *B01D 71/02* | (2006.01) |
| *B01D 63/06* | (2006.01) |
| *F02C 3/28* | (2006.01) |

(52) U.S. Cl.
USPC .................. 95/55; 95/45; 96/8; 96/10; 96/11; 60/39.12; 60/780

(58) Field of Classification Search
USPC ........ 96/4, 8, 10, 11; 95/45, 55, 56; 60/39.12, 60/780
See application file for complete search history.

(56) References Cited

U.S. PATENT DOCUMENTS

| | | | |
|---|---|---|---|
| 2,961,062 A * | 11/1960 | Hunter et al. ........................ 96/8 |
| 5,393,325 A | 2/1995 | Edlund | |
| 6,547,859 B1 | 4/2003 | Mullhaupt et al. | |
| 7,393,391 B2 | 7/2008 | Lopez et al. | |
| 7,396,382 B2 | 7/2008 | Ku et al. | |
| 7,404,843 B2 | 7/2008 | Kaschemekat et al. | |
| 2006/0189476 A1 | 8/2006 | Deckman et al. | |
| 2007/0072949 A1 | 3/2007 | Ruud et al. | |
| 2007/0125701 A1* | 6/2007 | Ramaswamy et al. ............ 96/11 |
| 2007/0125702 A1 | 6/2007 | Ramaswamy et al. | |
| 2008/0006574 A1 | 1/2008 | Ramaswamy et al. | |
| 2008/0070056 A1 | 3/2008 | Hatanaka et al. | |
| 2008/0176060 A1* | 7/2008 | Harold et al. .............. 428/316.6 |
| 2009/0001727 A1* | 1/2009 | De Koeijer et al. .......... 60/39.12 |

FOREIGN PATENT DOCUMENTS

| | | |
|---|---|---|
| WO | 9601684 | 1/1996 |
| WO | 2007067910 A2 | 6/2007 |
| WO | 2008124062 | 10/2008 |

OTHER PUBLICATIONS

PCT/US2010/039429 Search Report, Oct. 20, 2010.
N. Itoh, "Preparation of a tubular anodic aluminum oxide membrane," Journal of Membrane Science, vol. 117, 1996, pp. 189-196.
A. Kirchner et al., "Hydrogen Purification using Ultra-thin Palladium Films supported on Porous Anodic Alumina Membranes,", 2007.
V. Ramaswamy et al., "Membrane Structure and Method of Making," U.S. Appl. No. 11/296,746, filed Dec. 7, 2005.

(Continued)

*Primary Examiner* — Jason M Greene
(74) *Attorney, Agent, or Firm* — Francis T. Coppa

(57) ABSTRACT

A porous membrane structure is disclosed, which includes a porous substrate, a mesoporous, aluminum oxide layer disposed on the substrate; and a relatively thin, continuous, microporous barrier layer disposed on the mesoporous aluminum oxide layer, also formed from aluminum oxide. The membrane is capable of improving hydrogen selectivity within a gas stream, e.g., a synthesis gas composition. Membrane supports containing these structures are also described, as well as gas separation modules, and related processes. Power plants which incorporate the gas separation modules are also disclosed herein.

22 Claims, 7 Drawing Sheets

(56) References Cited

OTHER PUBLICATIONS

Anthony Y. Ku et al., "Syngas Cleanup Section With Carbon Capture and Hydrogen-Selectric Membrane," This related application to U.S. Appl. No. 12/538,327, filed Aug. 10, 2009.

Anthony Y. Ku et al., "Hybrid Multichannel Porous Structure for Hydrogen Separation," This related application to U.S. Appl. No. 12/538,301, filed Aug. 10, 2009.

* cited by examiner

MEMBRANES SUITABLE FOR GAS SEPARATION, AND RELATED ARTICLES AND PROCESSES

CROSS-REFERENCE TO RELATED APPLICATIONS

This application is related to U.S. application Ser. No. 12/538,327 Anthony Y. Ku et al), and U.S. application Ser. No. 12/538,301 (Anthony Y. Ku et al), both filed on the filing date of the present application, and assigned to the same assignee. The contents of both of these applications are incorporated herein by reference.

BACKGROUND

This invention generally relates to membranes, and their use in separating a gas from a gas stream. In some specific embodiments, the invention relates to the preferential separation of hydrogen from synthesis gas mixtures, and related power generation systems.

Membranes are selectively permeable barriers that can be used to separate gases. One exemplary application for membranes is to separate gases in power generation, specifically integrated gasification combined cycle (IGCC) power plants. These plants generate electricity from carbonaceous fuel such as coal, petcoke, or biomass, through a series of steps, including gasification of the solid fuel to form a mixture of hydrogen ($H_2$), carbon monoxide (CO), carbon dioxide ($CO_2$), water vapor, and trace impurities. The mixture is commonly known as "synthesis gas" or "syngas". Impurities are removed from the syngas mixture, through a series of clean-up operations. The cleaned gas is then combusted to produce electricity in a combined cycle.

IGCC plants offer advantages in efficiency because the clean-up of impurities is performed on high pressure gas streams before combustion. Membranes can be used in the IGCC clean-up process to separate the syngas into a fuel-rich stream that can be used to generate electricity, and a $CO_2$-rich retentate stream to enable "carbon capture". The use of a membrane for carbon capture can involve the selective permeation of $CO_2$ through the membrane, separating it from the rest of the gas stream, or can involve the selective permeation of hydrogen, the primary fuel gas. In an ideal situation for some power generation systems, gas separation is carried out at high temperature and pressure, so as to minimize the necessity for compressing the $CO_2$ prior to sequestration. In some cases, hydrogen-selectivity (as compared to $CO_2$ selectivity) is a key parameter in a gas separation system. In addition, a water-gas-shift reactor is usually employed upstream of the membrane. The water-gas-shift reactor converts carbon monoxide into hydrogen and carbon dioxide, to maximize the overall thermal efficiency of the plant.

Many types of membrane structures are available for gas separation at relatively high temperatures. Most are based on metallic or ceramic materials. While dense metallic membranes are useful for some gas separation processes, they are also deficient in some respects. For example, the metals in such membranes are often intolerant of sulfur. Therefore, in separating gas mixtures which may include compounds like hydrogen sulfide (e.g., gas streams produced from sulfur containing feedstocks such as low rank coal, petcoke, or biomass), metallic membranes can suffer irreversible degradation.

Porous ceramic membranes can also be used for gas separation processes, provided the pore size can be sufficiently controlled to enable high selectivity. The International Union of Pure and Applied Chemistry (IUPAC) designates "microporous" as having pores less than about 2 nm; and "mesoporous" as having pores ranging from about 2 to 50 nm. In general, "microporous" membranes have the potential to show high selectivity for $H_2$. Membranes with larger pores, for example "mesoporous" membranes, show limited $H_2$ selectivity.

In the case of membranes with pores larger than about 2 nm, but smaller than the mean free path for a gas, the transport mechanism is predominantly Knudsen diffusion. Knudsen diffusion has a different temperature dependence than activated transport, with the flux decreasing with the square root of temperature, as the temperature increases. In membranes where transport is dominated by Knudsen diffusion, the ideal membrane selectivity for gases is the inverse square root of the ratio of their molecular masses. For example, Knudsen $H_2/CO_2$ selectivity is about 4.7.

In general, the formation of microporous membranes which have fine pores and high flux characteristics (i.e., flow capacity) can be difficult. As an example, since the flux through a membrane can decrease with decreasing pore size, it is often desirable to employ membrane layers which are as thin as possible. However, it can be difficult to manufacture thin, porous layers which have uniform pores, and which are also mechanically robust.

Silica-based membranes are well-known in the art for use in gas separation processes. The manufacture of the silica membranes is a relatively straightforward and economical process, and in some situations, the membranes are very effective for gas separation. State-of-the-art silica membranes often consist of a thin silica layer, on top of a supported, porous aluminum oxide layer, which provides mechanical strength. Unlike the metallic-based membranes, silica-based membranes are somewhat more tolerant to the presence of sulfur-based compounds.

However, there are considerable drawbacks associated with silica membranes. For example, in some cases, there is poor reproducibility in the fabrication process, which can result in large fluctuations in performance, e.g., separation properties. Moreover, under elevated temperature conditions, silica can be very sensitive to steam, which adversely affects the microstructure and gas separation performance of the membrane structure.

With some of these concerns in mind, new membranes and membrane structures, based in part on porous ceramic materials, would be welcome in the art. The membranes should exhibit good hydrogen selectivity. The membranes should also be relatively tolerant of harmful gases like hydrogen sulfide, and in general, should be suitable for use in corrosive atmospheres. Moreover, the membranes should be capable of economic fabrication, and should generally be compatible with a variety of power generation and gasification systems that utilize fossil fuels, or biomass.

SUMMARY OF THE INVENTION

An embodiment of this invention is directed to a porous membrane structure, comprising:
 a) a porous substrate;
 b) a mesoporous, aluminum oxide layer disposed on the substrate, comprising a plurality of unconnected pores; and
 c) a relatively thin, continuous, microporous barrier layer disposed on the mesoporous aluminum oxide layer, comprising aluminum oxide, and capable of improving hydrogen selectivity within a gas stream contacting the membrane structure.

Another embodiment of the invention relates to a porous, tubular membrane structure, comprising:

(I) a tubular, porous substrate having an inner surface and an outer surface;

(II) a tubular, mesoporous, aluminum oxide layer which comprises a plurality of unconnected pores, having an inner surface and an outer surface, wherein the outer surface of the mesoporous aluminum oxide layer is in contact with the inner surface of the porous substrate; and (III) a thin, continuous, microporous barrier layer which comprises aluminum oxide, having an outer surface which contacts the inner surface of the mesoporous aluminum oxide layer; and an inner surface which defines a cavity;

wherein fluid communication between the outer surface of the substrate and the cavity is capable of occurring through layers I (substrate), II, and III. Membrane supports which include at least one of these tubular membrane structures represent another embodiment of the invention.

A gas separation module is also an inventive embodiment. The module comprises at least one membrane support, as described herein, extending through a length of the module. The module can be positioned within an enclosure to allow the structure to be exposed to a fluid stream containing hydrogen and other components. It is capable of allowing hydrogen to be preferentially transported across the membrane, thereby separating hydrogen from the other components.

An additional embodiment is directed to a power plant, comprising

I) a gasification unit which converts carbonaceous fuel into synthesis gas;

II) a water-gas-shift reactor in flow-communication with the gasification unit, and configured to receive the synthesis gas, and to produce a gaseous product mixture comprising hydrogen and carbon dioxide;

III) a membrane unit in flow-communication with the water-gas-shift reactor; and capable of separating hydrogen from the gaseous product mixture; wherein the membrane unit includes at least one porous membrane structure, as described herein; and IV) a power generation unit in communication with the membrane unit, so as to accept the hydrogen separated in the membrane unit as a fuel source, wherein the power generation unit is configured to produce electricity.

A method for separating hydrogen from a fluid stream is also described herein. The method comprises the step of contacting the fluid stream with a porous membrane structure, to preferentially transport hydrogen across the structure. The membrane structure is described below in detail.

DRAWINGS

DETAILED DESCRIPTION OF THE INVENTION

Any compositional ranges disclosed herein are inclusive and combinable (e.g., ranges of "up to about 25 wt %", or, more specifically, "about 5 wt % to about 20 wt %", are inclusive of the endpoints and all intermediate values of the ranges). Weight levels are provided on the basis of the weight of the entire composition, unless otherwise specified; and ratios are also provided on a weight basis. Moreover, the term "combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" herein do not denote a limitation of quantity, but rather denote the presence of at least one of the referenced items.

The modifier "about" used in connection with a quantity is inclusive of the stated value, and has the meaning dictated by context, (e.g., includes the degree of error associated with measurement of the particular quantity). The suffix "(s)" as used herein is intended to include both the singular and the plural of the term that it modifies, thereby including one or more of that term (e.g., "the refractory element(s)" may include one or more refractory elements). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Figure 1:
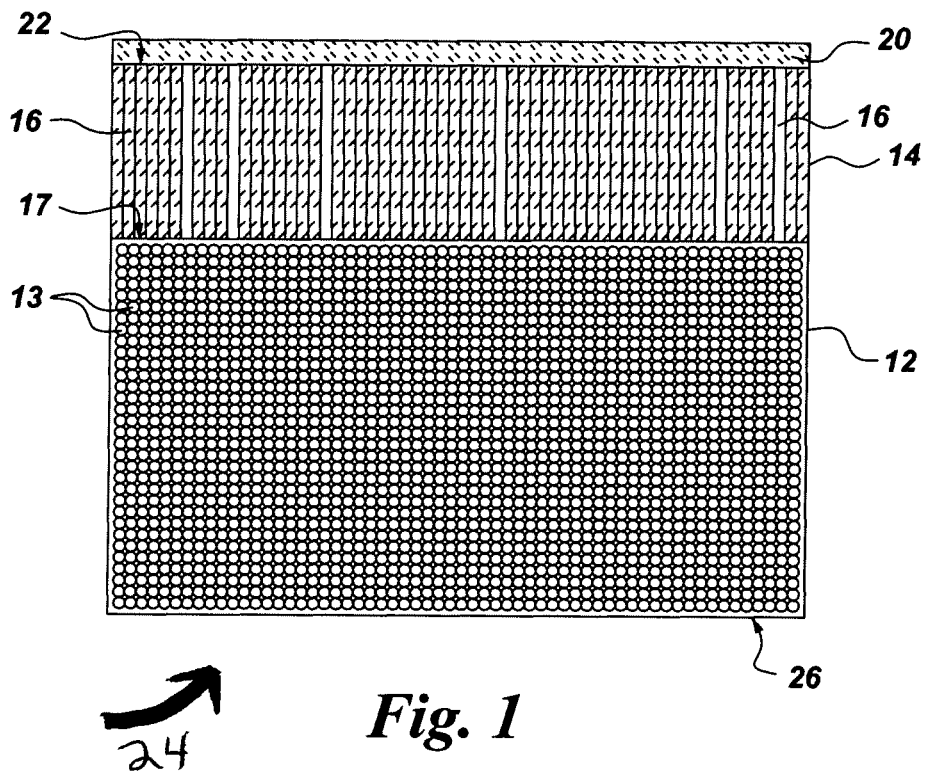
FIG. 1 is a schematic, cross-sectional representation of a membrane structure according to embodiments of the present invention.

An exemplary membrane structure 10 for some embodiments of the invention is depicted in FIG. 1. (The figure is a cross-sectional cutaway of a typical, tubular membrane structure, as described below). The substrate or "first layer" 12 for the membrane structure can be formed of a variety of porous materials. Examples include ceramics, metals, and polymers, or combinations of any of these materials. When the substrate is a metal-containing material, it may be passivated with a polymer layer or a ceramic layer. Non-limiting examples of the ceramic materials which may be suitable for the substrate are as follows: alumina, silica, zirconia, (or stabilized zirconia); carbides, nitrides, borides, rare-earth oxides, titania, lanthana, perovskites, spinels, vanadia, ceria, and any combination thereof. In some embodiments, the ceramic material may include a suitable dopant.

Many types of metals can be used for the substrate, if they are coated or otherwise treated to make them nonconductive. Non-limiting examples include: iron, nickel, titanium, chromium, aluminum, and alloys thereof, e.g., steel, stainless steel, various Hastelloy® alloys such as Hastelloy C-22; and various Inconel® alloys, such as Inconel C-22. In one embodiment, the metal substrate is formed of an alloy comprising chromium and nickel. The metal should be provided with an electrically nonconductive (passivating) coating.

With continued reference to FIG. 1, many types of polymeric materials can be used for the substrate 12. Some of these materials are thermosetting, while others are thermoplastic, usually with a glass transition temperature (Tg) high enough to withstand process temperatures encountered in the particular end-use application. Non-limiting examples include: polysulfones, polyamides, cross-linked polyimides, polyether ketones, polyetherimides, silicone rubbers, nitrile rubbers, silicones, polycarbonates, polyarylenes, polyphenylene ethers, polyolefin elastomers, polybutadienes, polyethylene oxides, polypropylene oxides, vinyl polymers, and various combinations (mixtures or copolymers) thereof.

In preferred embodiments, the substrate 12 is formed of a ceramic material. As alluded to previously, ceramic materials have the advantages of thermal and chemical stability, good erosion resistance, and high-pressure stability. These attributes enhance the ability of the membrane structure to withstand prolonged exposure to pressure or temperature differences that may be present in a gas separation device, for example.

As noted above, substrate 12 includes a plurality of pores 13. The amount of porosity in the substrate will depend on various factors, such as the identity of the substrate material; the physical requirements of the substrate (since it provides overall support for the structure); and the manner in which anodization of an overlying layer is carried out (as described below). In most instances, the substrate has a porosity volume fraction of at least about 10%. In some instances, the porosity volume fraction is at least about 20%, and often, in the range of about 20% to about 70%.

Moreover, those skilled in the art are familiar with various techniques for the formation of the substrate. Casting, tape-casting, spraying, molding, extrusion, and the like represent typical techniques. The most appropriate substrate fabrication technique will of course depend in part on the composition of the substrate. Various procedures for providing porosity in the substrate are known in the art. Examples are provided in U.S. Patent Publication 2008/0006574 (Ramaswamy et al, published on Jan. 10, 2008), which is incorporated herein by reference. In general, the thickness of the substrate will depend on some of the factors discussed above. Usually, the substrate has a thickness in the range of about 100 um to about 50 cm, and most often, in the range of about 200 um to about 10 cm. Moreover, the shape and end use of the substrate influences choice of thickness as well. For example, tape-cast sheets may be relatively thin, while multi-channel tubes may require thicker substrates, within the general ranges set forth above.

With continued reference to FIG. 1, a mesoporous aluminum oxide layer 14 is disposed over substrate 12. Aluminum oxide layer 14 includes substantially unconnected pores 16. The pore structure or "architecture" of layer 14 has a highly significant impact on membrane performance, and depends in part on the end use application of the membrane. In some preferred embodiments, layer 14 comprises a plurality of cylindrical pores 16 of substantially uniform size. As depicted in FIG. 1, the pores may be aligned substantially perpendicular to substrate surface 17, often having a columnar shape. However, other pore shapes and pore arrangements are also possible.

In some specific embodiments, the average pore size (i.e., the pore diameter) of pores in mesoporous layer 14 is less than about 1 micron. In certain embodiments, the average pore size is in a range from about 1 nanometer to about 300 nanometers. Moreover, in some specific embodiments in which the membrane structure is being used to separate hydrogen from a gas mixture, the average pore size may be in the range of 1 nanometer to about 100 nanometers. Moreover, in some embodiments, it may be desirable to grade the pore size, through all or a portion of the depth of mesoporous layer 14. For example, the pores in the upper region of layer 14 (i.e., relative to the substrate) may have a relatively small size, which progressively increases for pores closer to the substrate. The anodization process described below can be adjusted to achieve a graded structure.

The thickness of mesoporous layer 14 will depend on various factors as well, as further mentioned below. The key factors determining layer 14 thickness are: the surface profile (e.g., roughness of the underlying substrate 12; as well as the pore size and pore size-distribution of the substrate. Usually, layer 14 has a thickness less than about 10 microns. In some specific embodiments, the thickness is in the range of about 10 nanometers to about 3 microns, and sometimes, in the range of about 10 nanometers to about 1 micron. In some specific embodiments, the thickness is in the range of about 10 nanometers to about 200 nanometers. (The figures are drawn for ease-of-viewing, and are not specifically intended to set out actual, relative dimensions).

A relatively thin, microporous barrier layer 20 is disposed over the upper surface 22 of mesoporous layer 14. The barrier layer comprises aluminum oxide, and as described below, is often the result of an anodization process. Moreover, the barrier layer is very uniform and continuous. As used herein, "relatively thin" serves as a comparison to the thickness of mesoporous layer 14. The thickness of barrier layer 20 is usually less than about 50 nanometers, and in some instances, less than about 30 nanometers. Moreover, the average size of the pores in the barrier layer is usually less than about 2 nanometers, and more often, less than about 1 nanometer. For embodiments in which the barrier layer is formed as a result of the anodization process described below, the layer is usually no thicker than the diameter of pores in the adjacent region of mesoporous layer 14.

The desired pore size can also be expressed in terms of hydrogen flux and the activated transport characteristics through the membrane. In an activated process, the passage of hydrogen (the "flux") through the membrane increases exponentially with increasing temperature according to the expression $J(T)=J_0 \exp(-E_a/R(1/T_0-1/T))$, where J is the flux, $E_a$ is the activation energy, and T is the temperature. The activation energy is indicative of, among other factors, the pore size. An exponential increase in flux at $E_a$ values of greater than about 5 kJ/mole is generally indicative of an average pore size in the barrier layer of less than about 1 nanometer. In microporous membranes, gases with smaller molecular sizes tend to have a higher temperature-dependence. Consequently, the selectivity favors smaller molecules, and becomes more pronounced as the temperature is increased. For membranes with a pore size less than about 10 nm, it is difficult to directly measure the pore size. In these cases, the trend in $H_2$ flux as a function of temperature can be used as an indicator of whether the average pore size is in the microporous or mesoporous range.

The presence of barrier layer 20 is important for providing enhanced separation capabilities for hydrogen gas, as compared to a membrane structure without the barrier layer intact. The improvement appears to be due in part to the thin, continuous, microporous characteristics for a gaseous stream containing various combustion gasses like carbon dioxide and hydrogen. It is expected that the hydrogen:carbon dioxide selectivity ratio would be greater than about 1.0, allowing for relatively efficient separation of hydrogen from a syngas feed stream, for example. Moreover, in preferred embodiments, the aluminum oxide composition for both the mesoporous layer and the barrier layer provides greater hydrothermal stability than some of the conventional silica-based membrane structures used for gas separation.

In preferred embodiments, mesoporous layer 14 comprises an oxide product of an anodization process. Anodized aluminum oxide is characterized by a number of important attributes, such as thermal stability, chemical stability, high-pressure stability, good corrosion resistance, and good erosion resistance. Procedures for preparing anodized aluminum oxide are known in the art. Many anodizing specifications are in existence. For example, military specification MIL-A-8625 covers chromic acid anodization, sulfuric acid anodization, and sulfuric acid hardcoat anodization. Another common standard is covered in ASTM B580. Anodizing techniques are also set forth in International Publication WO 2008/124062 A1 (Ma et al), which is incorporated herein by reference.

In one illustrative embodiment, a layer of aluminum metal is first applied over surface 17 of substrate 12. Many techniques for applying such a layer are known in the art, including physical vapor deposition (e.g., evaporation, sputtering), chemical vapor deposition (CVD); and various plating processes, e.g., electroless deposition techniques. Usually, the aluminum layer is then cleaned, e.g., chemically, or by an ultrasonic technique. Moreover, the aluminum layer can also be subjected to other treatment steps, such as polishing or annealing. The most appropriate technique or combination of techniques for applying and preparing the aluminum metal layer can be determined without undue effort, based on the teachings herein. The primary objective of the treatments is to obtain homogenous conditions which will promote the desired pore growth during subsequent anodizing.

Various techniques can be used for the anodization process, as described, for example, in the previously-referenced disclosures, WO 2008/124062 (Ma et al); U.S. Patent Application 2008/0006574 (Ramaswamy et al); and in U.S. Patent Application 2008/0070056 (Hatanaka et al), which is also incorporated herein by reference. In most embodiments, anodization is carried out through substrate 12, i.e., from direction 24, as generally depicted in FIG. 1. For example, membrane structure 10 could be placed in an anodization bath, so that the bottom surface 26 of the substrate and at least a portion of the remaining substrate structure 12 are immersed in the bath (not shown).

Typically, the anodizing cell includes a plurality of electrodes, and substrate 12 is used as the anode. In many cases, anodizing is carried out at a voltage in the range of about 1 volt to about 200 volts DC. However, the most appropriate voltage levels will depend on various factors, such as the desired pore size for the mesoporous layer, and the thickness of the microporous barrier layer. The anodizing solution can comprise a number of acids or acid mixtures, although oxalic acid (e.g., about 3% oxalic acid) is frequently used. The temperature of the anodizing bath usually varies in the range of about 1° C. to about 50° C. Process times can also vary, e.g., usually (though not always) between 5 minutes and about 2 hours.

Other processing steps may be carried out after anodization is complete. For example, any traces of aluminum metal which remain bonded to the surface of anodized aluminum oxide layer 14 can be removed by an appropriate chemical treatment, e.g., with copper chloride or iron chloride. Moreover, in cases where the porous substrate comprises metal, a subsequent treatment with a dilute acid (e.g., phosphoric acid) can be used to prevent or minimize corrosion of the substrate.

The anodizing process alters the microscopic structure and chemical composition of the layer of aluminum metal, resulting in the mesoporous aluminum oxide layer (layer 14 in FIG. 1). Pores 16 are generally unconnected to each other, and in most instances, are characterized by a relatively ordered arrangement. The specific microscopic structure will depend on the end use of the membrane. As described in the Ramaswamy reference, the pore size could be purposefully altered or "tuned" by varying anodization conditions during the treatment stage. For example, sublayers with different pore sizes could be formed, to maximize flux and selectivity characteristics for a given situation.

The anodizing process also results in the formation of microporous barrier layer 20, as described previously. The layer is similar to the barrier layer formed in the Ramaswamy reference described previously. However, its location is different, due to the direction from which anodization was carried out. Moreover, in the case of previous membrane structures, a barrier layer of this type is usually removed after its formation. However, for the present membrane structure, the inventors discovered that maintaining the barrier layer in its position may considerably enhance the capacity of the membrane to effectively separate hydrogen from a mixed gas stream.

In most membrane-based gas separation systems, many individual membranes are employed, so that a large membrane area can be packed into a relatively small volume. In general, membranes are somewhat delicate structures, and susceptible to damage, so they are typically incorporated into modules or elements. Thus, another embodiment of this invention is directed to a gas separation module which contains the membrane structure described above.

Many different modules can be used for this invention. Some are generally described in U.S. Pat. No. 7,404,843 (Kaschemekat et al), which is incorporated by reference, and in co-pending application Ser. No. 12/538,301, assigned to the assignee of the present Application. The module is sometimes in the form of a cylindrical pressure housing or tube, and in other cases, in the form of spiral-wound enclosures. However, in some cases, any rigid tube or housing can be used, e.g., a ceramic tube, with the gas-selective membrane as the inside or outside surface.

Figure 2:
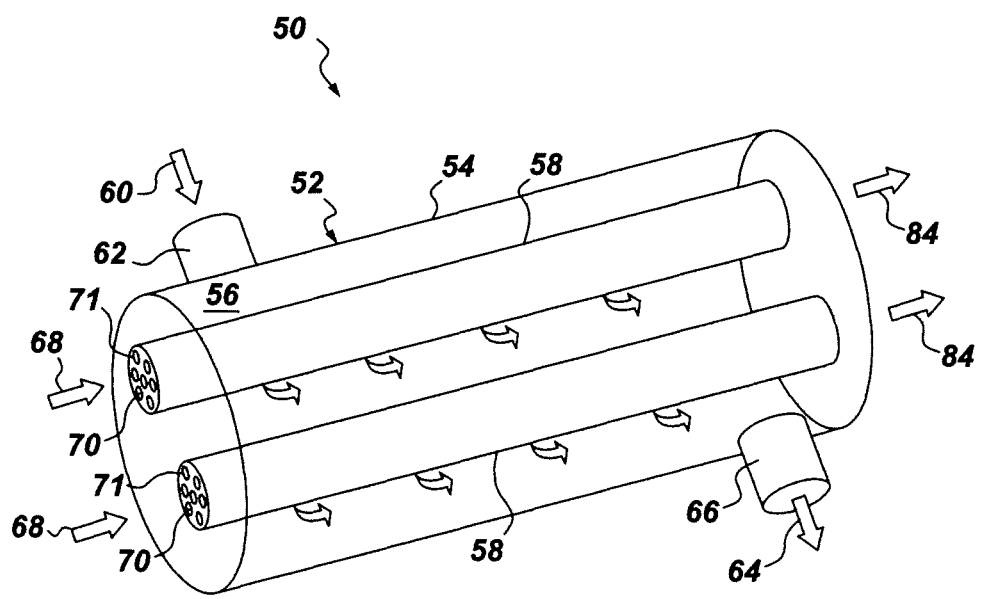
FIG. 2 is a side-perspective view of a membrane module, according to embodiments of this invention.

FIG. 2 depicts an exemplary gas separation module 50 for the present invention, as set forth in co-pending application Ser. No. 12/538,301. (Although the module is based on a hybrid, multi-channel porous structure, other module structures can be used, as mentioned previously). Module 50 includes a housing 52, which can be made from a number of materials, such as stainless steel. In this embodiment, the housing is generally tubular, and includes an outer surface 54, forming a cavity 56 therein. In this instance, outer surface 54 has a circular, cross-sectional shape, with each side having approximately the same length. However, many other shapes are possible, e.g., hexagonal.

At least one ceramic membrane support 58 (also sometimes called a "membrane support structure" herein) is disposed within cavity 56 of housing 52. The membrane supports 58 are sealed in the housing 52, e.g., using polymeric gaskets, with a choice of materials to fit specific needs. It should be noted that these embodiments are not limited by the number of membrane supports 58 that are disposed within the housing 52. While FIG. 2 shows a total of two membrane supports 58, the number could be considerably greater. Each membrane support contains at least one membrane structure 71 (like those described above), which will be further described in reference to FIG. 3. The membrane structures 71 are usually concentric through the length of the membrane supports.

With continued reference to FIG. 2, this module is generally characterized as a "shell and tube" configuration, in which the shell is the tubular housing 52, and the "tubes" are the membrane supports 58. A first feed stream 60 can be introduced into the housing 52 through first inlet 62. The feed stream 60 contacts the outer surface of each membrane support 58, and can exit at the opposite end of the housing, as a retentate 64, through a first outlet 66. An optional sweep stream 68 can be introduced into the channels 70 of the membrane supports 58. The axially-oriented channels 70 can vary in diameter and length, and can be present in any desired number, as described in application Ser. No. 12/538,301. The channels typically extend axially, from one end of structure 50 to an opposite end. Usually, the sweep stream 68 travels through each support 58, and exits at an opposite end of the housing 52, as the remaining sweep stream and permeate 84.

In the illustrated embodiment, module 50 has a co-current flow configuration with two inlets and two outlets, in which the feed stream 60 and the sweep-stream 68 are introduced at the same end of the housing 52. Moreover, the two streams flow in the same direction through housing 52, and exit at the opposite end of the housing. However, it will be appreciated that module 50 can be configured in a counter-current flow configuration, in which the feed stream 60 is introduced at an opposite end of the housing 62 as the sweep stream 68, flows through the housing 52 in an opposite direction as the sweep stream 68, and exits at the opposite end of the housing 52 as the sweep stream 68.

Figure 3:
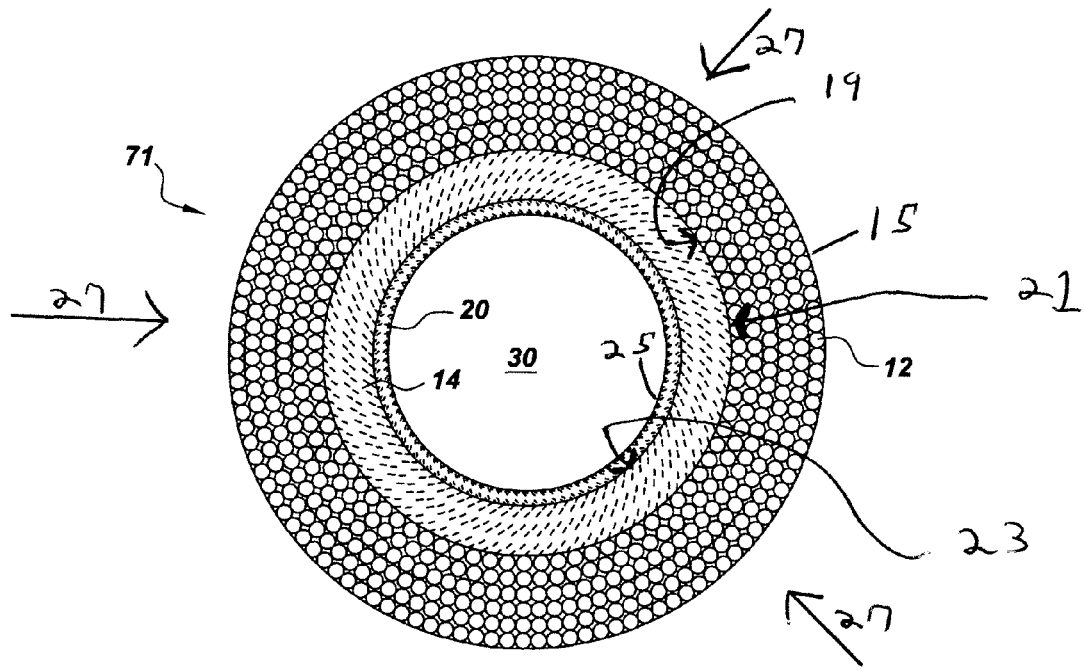
FIG. 3 is an enlarged, end-view perspective of a membrane structure according to embodiments of this invention.

FIG. 3 is an enlarged, end-view perspective of a membrane structure similar to that of structure 71 (FIG. 2). Some of the figure elements are identical to those in FIG. 1, for the sake of context. (The relative thickness of each layer is not drawn to scale, for ease-of-viewing). Porous substrate layer 12 includes an outer surface 15 and an inner surface 19. (While the pores in substrate 13 are depicted as uniform and vertical, relative to the cross-sectional plane, it should be understood that the pores need not be arranged with such uniformity, and can be individually oriented in different directions as well). The substrate layer surrounds mesoporous, aluminum oxide layer 14, which has an outer surface 21 and an inner surface 23. As described above, layer 14 is usually an anodized aluminum oxide layer. Layer 20 is the relatively thin, continuous microporous barrier layer—often formed as a result of the anodization process. Layer 20 includes an inner surface 25, which defines channel 30. The channel extends through the length of the membrane structure, as further described generally in FIG. 4. As shown in FIG. 3, layers 12, 14, and 20 are concentric to each other in this embodiment. However, other membrane shapes (i.e., other than tubular) are possible. Arrows 27 in FIG. 3 generally depict the direction of flow of a gas stream contacting the membrane structure.

Figure 4:
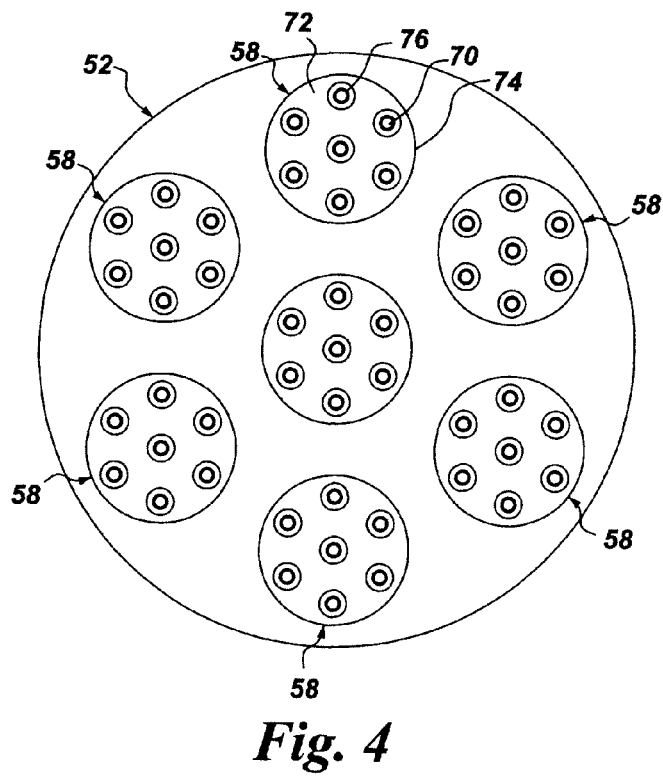
FIG. 4 is an enlarged, end-view perspective of a membrane module according to some inventive embodiments.

FIG. 4 is a cross-sectional view of another gas separation module according to embodiments of this invention. (The figure numerals are the same as those in FIG. 2, for identical or analogous features). In this instance, module housing 52 is depicted as being tubular in shape, although other shapes are possible. Moreover, seven membrane supports 58, rather than two supports, are incorporated into the module.

In this embodiment, each membrane support 58 includes seven membrane structures 76, although that number can vary as well also. (Each of the membrane structures 76 can have a configuration as described above for FIG. 3). A channel 70 extends through each membrane structure 76. The membrane structures 76 are surrounded by a porous support material 72, e.g., a packed material comprising alumina, silicates, silicon carbide, or various other ceramic or nonconductive materials. The module can also include other optional features, e.g., shift catalyst layers of material over the membrane structure, as described in application Ser. No. 12/538,301.

The gas separation module described above (FIGS. 2 and 4) can be used in a number of ways. As a non-limiting illustration, the feed stream can comprise high-pressure syngas, which contains a mixture of hydrogen, carbon monoxide, and various other gases. The feed stream can be directed against the outer surface 74 of membrane supports 58 (FIG. 2). The porous support body 72 (FIG. 4) of each support 58 selectively allows the hydrogen gas to pass through the pores of the membrane layer 76, in a cross-flow or tangential flow, and into channels 70.

In one embodiment (e.g., FIG. 2), the optional sweep stream 68, traveling through the channels 70, may contain a gas, such as nitrogen, which combines with the hydrogen gas to form a nitrogen/hydrogen gas composition. The sweep stream 68 then travels through and exits the channels 70 at the opposite end of structure 50. The feed stream 60, which is now significantly depleted of hydrogen gas, exits through the outlet 66 as the retentate 64, on or near the opposite end of structure 50, as described previously.

The module 50 provides a high surface-to-volume ratio that can be manufactured at a relatively low cost. In addition, the module can be easily scaled in size to meet the design requirements of a specific application. Furthermore, use of the membrane structure described above in the module is expected to enhance overall gas separation performance in some syngas production systems.

As mentioned above, the membrane modules of this invention can be used for a variety of purposes. One primary end use is the separation of hydrogen in a gas mixture, e.g., a mixture which is formed before, during, or after a combustion, gasification, or reforming process. Various types of power plants include operation units in which such gas mixtures are present. Non-limiting examples include the IGCC power plants described previously. These plants rely on at least one gasification unit which converts carbon-containing material (e.g., coal) into synthesis gas (syngas). As set forth above, these power plants usually include at least the following operations, according to embodiments of this invention: at least one gasification unit; at least one water-gas-shift reactor; at least one membrane unit suitable for hydrogen gas separation; and at least one power generation unit.

Figure 5:
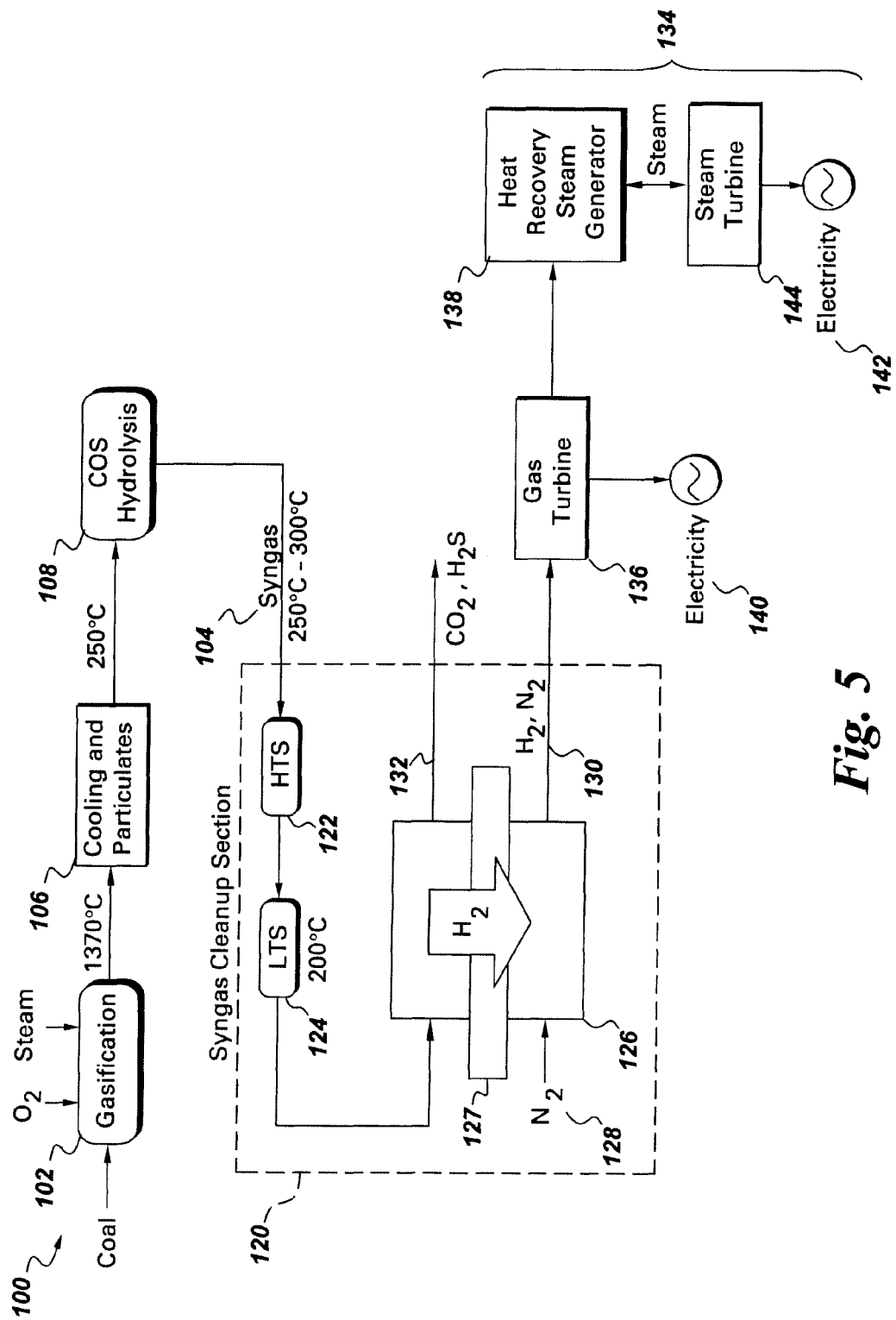
FIG. 5 is a schematic view of a power plant, according to various embodiments of this invention.

FIG. 5 is a schematic view of an exemplary, integrated gasification combined cycle (IGCC) power plant 100, for electricity production, with hydrogen ($H_2$) separation. (The power plant is also described in co-pending application Ser. No. 12/538,301). Plant 100 includes a gasification unit 102 that receives coal, oxygen containing material, and high temperature steam or water therein, and produces a syngas 104. The gasification unit 102 is in flow communication with at least one syngas cooler 106, configured to remove heat and particulates. The syngas cooler communicates with a carbonyl sulfide (COS) hydrolysis unit 108, that is configured to convert COS to hydrogen sulfide ($H_2S$) in the syngas 104. The syngas 104 is then processed through a syngas clean-up section 120, according to some embodiments of the invention.

With continued reference to FIG. 5, the individual operations within the clean-up section can vary significantly. In the exemplary embodiment, the clean-up section 120 includes a plurality of individual unit operations, including a high-temperature shift (HTS) reactor 122, and a low-temperature shift (LTS) reactor 124. (These are usually water-gas-shift reactors). The HTS 122 includes a catalyst optimized for high temperature operation (about 300-400° C.) and the LTS 124 includes a catalyst optimized for low temperature operation (about 200° C.). The syngas clean-up section 120 also includes a membrane module 126, which would be at least one of the gas separation modules described previously. The membrane module is capable of continuously removing the $H_2$ produced in the HTS reactor 122 and the LTS reactor 124.

During operation, in the exemplary embodiment, $H_2$ passes through the membrane structure 127 of the invention. An optional, high-pressure sweep gas 128, such as $N_2$ and the like, is introduced to membrane module 126, to remove $H_2$ through a stream 130, which is depleted in $CO_2$ and $H_2S$. The $CO_2$ and $H_2S$ that are produced by reactors 122 and 124 (and which exit from membrane module 126) can be processed by a $H_2S$ separation unit (not shown), and a $CO_2$ recovery unit (not shown). The $H_2S$ can be typically removed, using either a physical or a chemical absorption process in the $H_2S$ separation unit. The $H_2S$ removal processes typically require the use of solvents, such as Selexol® products, which are regenerated in a solvent regeneration unit (not shown). Elemental sulfur (S) is usually produced.

The gas exiting the $H_2S$ separation unit enters the $CO_2$ recovery unit, where the $CO_2$ is removed by using a solvent (usually one similar to one used in the $H_2S$ separation unit). With continued reference to FIG. 5, the stream 130 of $H_2$ (and often, nitrogen) is directed to a combined cycle power generation unit 134, which includes a gas turbine 136, producing electricity 140. According to IGCC principles, exhaust heat from the combustion operation is directed to the heat recovery steam generator 138, to produce additional electricity 142, via steam turbine 144.

EXAMPLES

The examples presented below are intended to be merely illustrative, and should not be construed to be any sort of limitation on the scope of the claimed invention.

Porous alumina substrates, ⅜ inch (0.95 cm) in diameter, were fabricated by tape-casting alumina slurry, followed by drying, punching and sintering. One surface of each substrate was coated with aluminum, using physical vapor deposition, to obtain an aluminum film about 1 micron in thickness. Copper tape with a conductive adhesive was carefully applied to an edge of the sample in order to make electrical contact with the aluminum metal.

The button sample was then anodized in 0.3M oxalic acid. The cathode or counter-electrode was platinum mesh. The anodization voltage was varied between 15 V and 2 V. Conversion of aluminum to porous aluminum oxide took place through the porous support, resulting in the formation of an interfacial layer of AAO (anodized aluminum oxide). The surface of the aluminum was not substantially anodized, due to the presence of the nail polish mask. After anodization, the sample was rinsed thoroughly with deionized water. The nail polish was then removed by soaking the sample in acetone for 1 hour, followed by an acetone rinse. Any surface oxidation product was then removed from the metallized face, by covering the face in 5 wt % phosphoric acid, for 20 minutes. Following that step, the sample was again washed in deionized water. The aluminum metal was then removed by submerging the sample in a saturated $FeCl_3$ solution, for 2 hours. Finally, the sample was washed again with deionized water, dried, and mounted for helium selectivity measurements.

Each test button was then placed in a test rig, and exposed to a 50:50 $CO_2$/helium feed stream. The permeate gas composition was measured, using a Hiden mass spectrometer, while heating from room temperature to about 250° C. (In membrane applications, helium is an acceptable substitute for hydrogen, due to their similar molecular sizes and activated transport behaviors).

Figure 6:
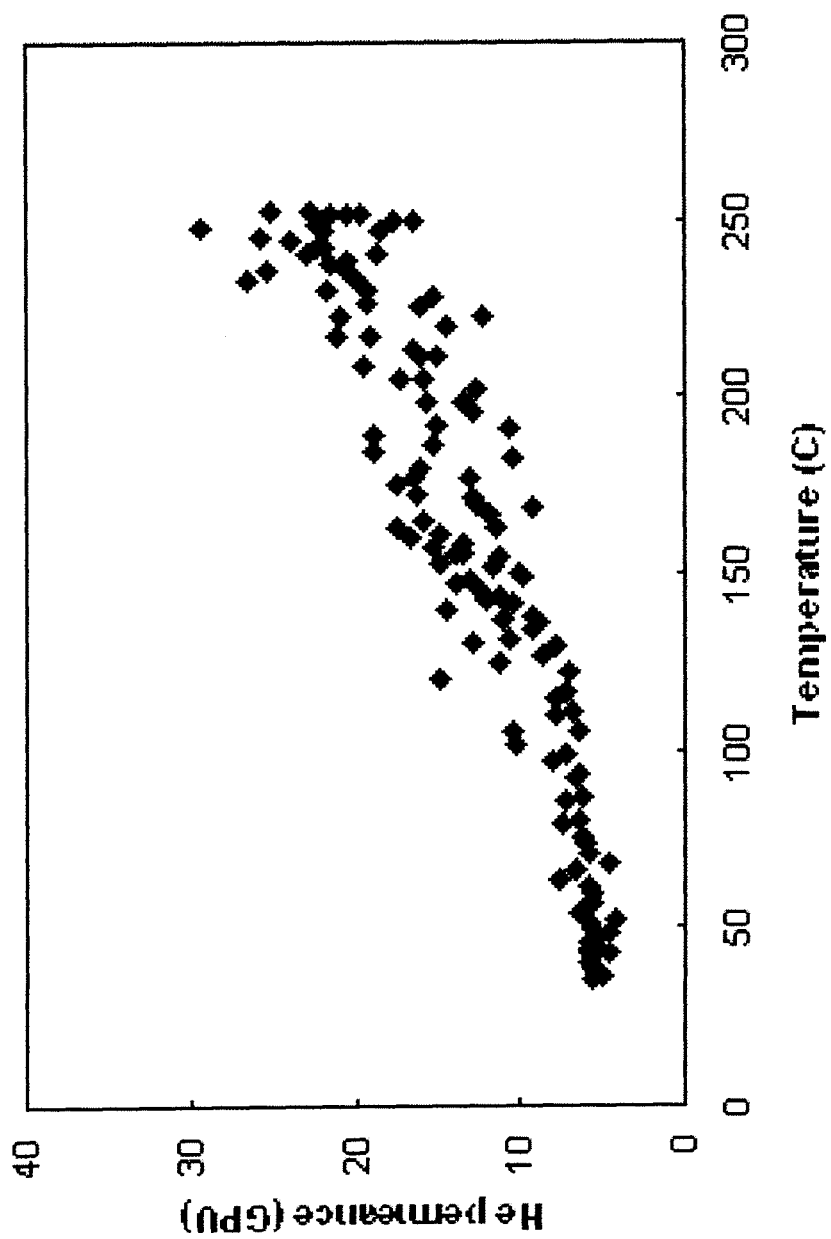
FIG. 6 is a plot of gas permeance as a function of temperature.
Figure 7:
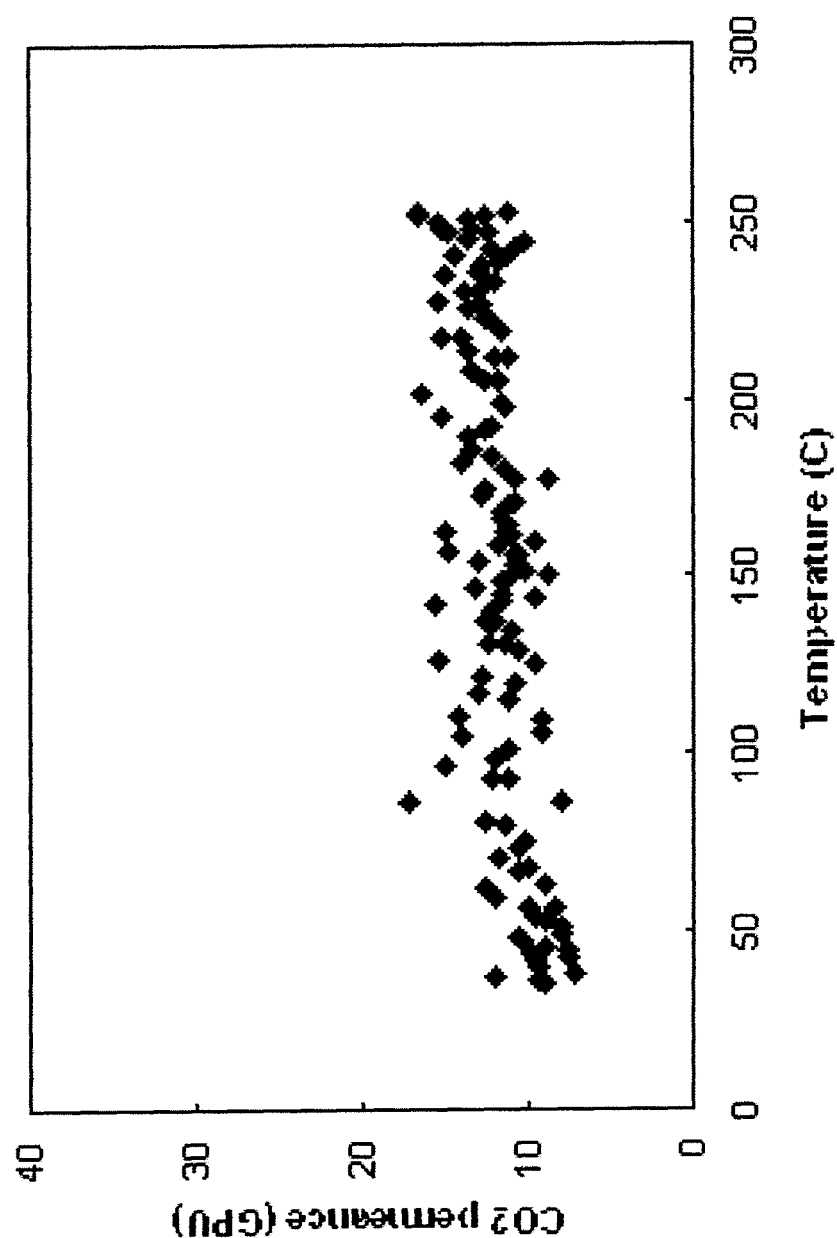
FIG. 7 is another plot of gas permeance as a function of temperature.

FIGS. 6 and 7 show the helium and $CO_2$ permeance as a function of temperature. The He permeance increases exponentially with temperature, consistent with activated transport. This behavior is indicative of a microporous structure. In contrast, the $CO_2$ permeance increases weakly with temperature.

Figure 8:
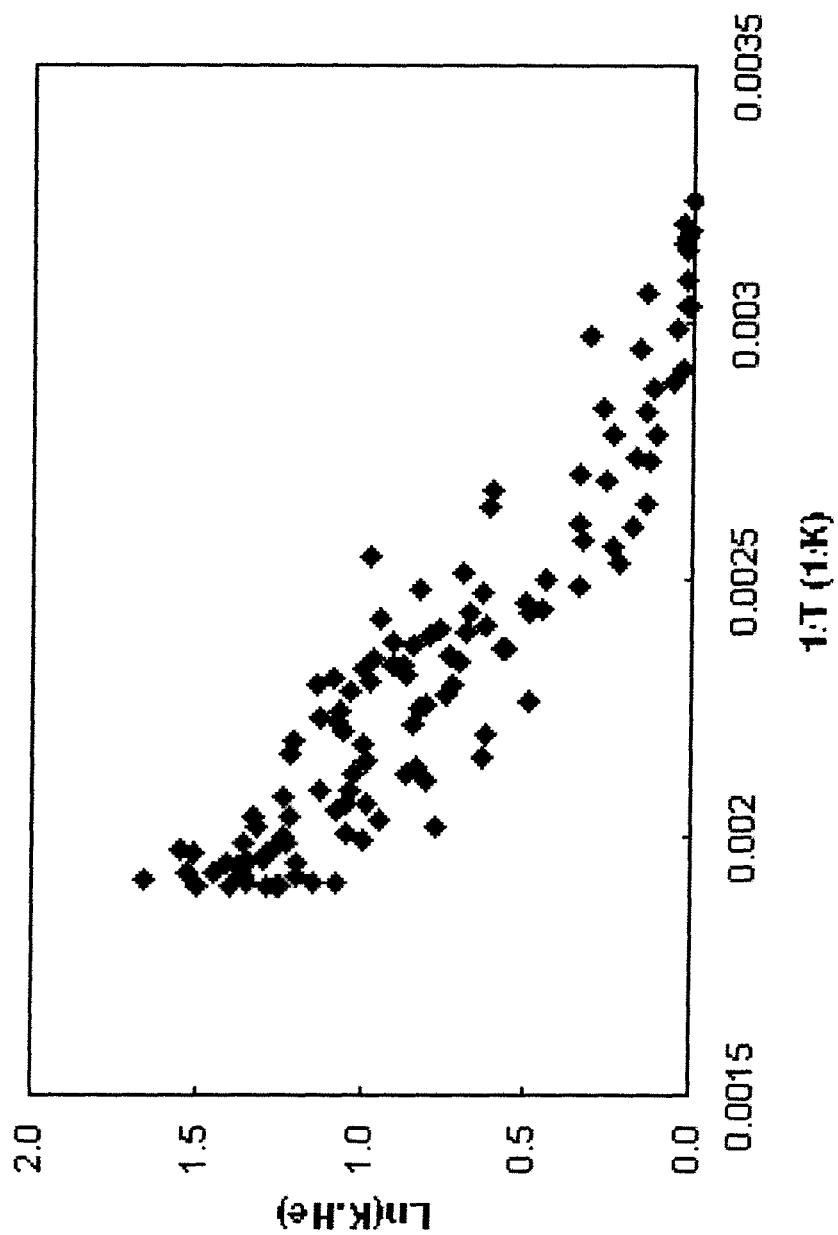
FIG. 8 is an Arrhenius plot of gas permeance (natural logarithm) as a function of the inverse of temperature.
Figure 9:
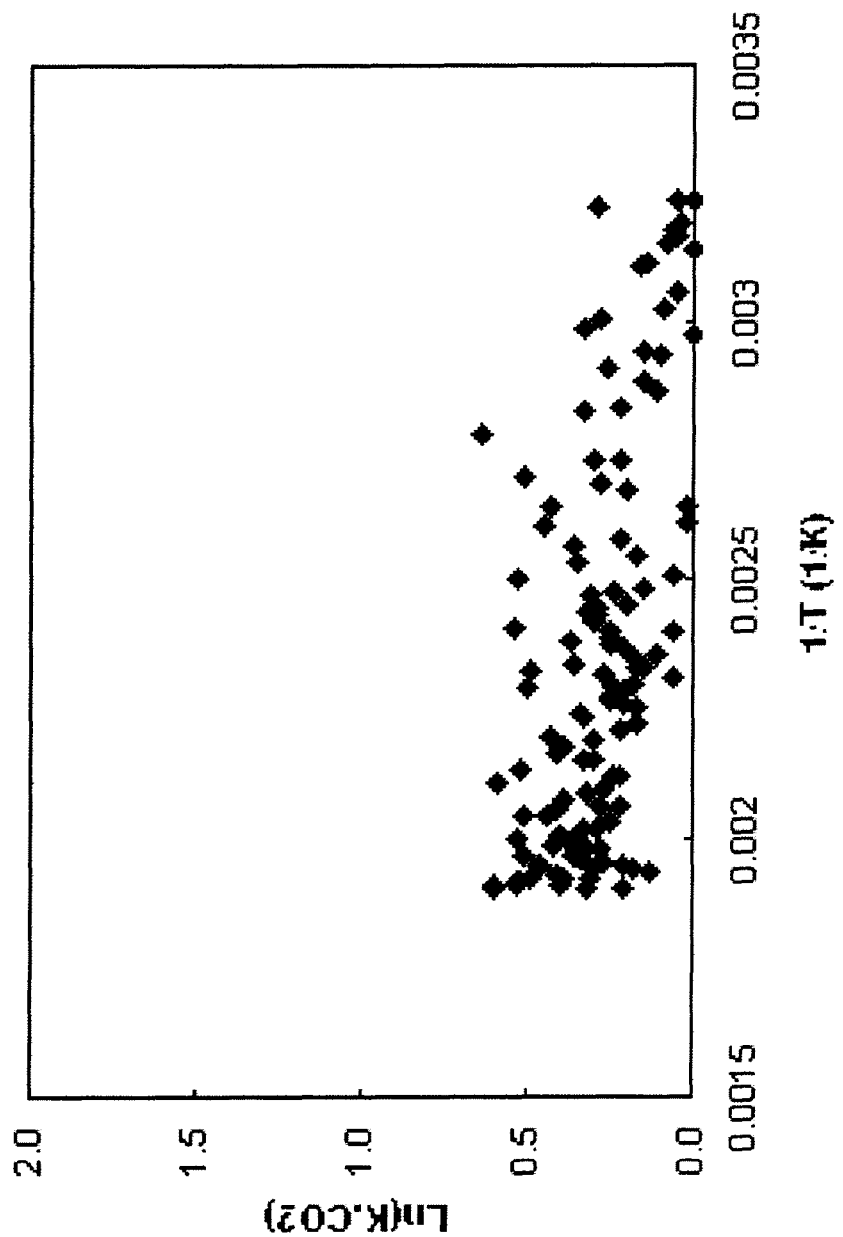
FIG. 9 is another plot of gas permeance as a function of temperature.

FIGS. 8 and 9 show an Arrhenius plot of the He permeance, where the natural logarithm of the permeance is plotted against the inverse of temperature. A linear fit to the data results in a calculated activation energy for the He permeance of about 9.5 kJ/mol. This is comparable to the activation energy of other microporous membrane materials, such as microporous silica membranes. The activation energy for $CO_2$ permeance is about 2.3 kJ/mol.

Although this invention has been described in terms of specific embodiments, they are intended for illustration only, and should not be construed as being limiting in any way. Thus, it should be understood that modifications can be made thereto, which are within the scope of the invention and the appended claims. All of the patents, patent applications, articles, and texts which are mentioned above are incorporated herein by reference.

The invention claimed is:

1. A porous membrane structure, comprising
   a) a porous substrate;
   b) a mesoporous, aluminum oxide layer disposed on the substrate, comprising a plurality of unconnected pores; and
   c) a relatively thin, continuous, microporous barrier layer disposed on the mesoporous aluminum oxide layer, comprising aluminum oxide, and capable of improving hydrogen selectivity within a gas stream contacting the membrane structure.

2. The membrane structure of claim 1, wherein the substrate comprises a material selected from ceramics, metals, polymers, and combinations thereof.

3. The membrane structure of claim 1, wherein the substrate comprises aluminum oxide.

4. The membrane structure of claim 1, wherein the substrate has a porosity volume fraction in a range from about 20% to about 70%.

5. The membrane structure of claim 1, wherein the mesoporous, aluminum oxide layer has a thickness in the range of about 10 nm to about 3 microns.

6. The membrane structure of claim 1, wherein the mesoporous aluminum oxide layer comprises anodized aluminum oxide.

7. The membrane structure of claim 1, wherein the average pore size of pores in the mesoporous aluminum oxide layer is less than about 1 micron.

8. The membrane structure of claim 1, wherein the average pore size of the pores in the mesoporous aluminum oxide layer is graded at least through a portion of the depth of the layer.

9. The membrane structure of claim 1, wherein the average pore size of pores in the mesoporous aluminum oxide layer is in the range of about 1 nanometer to about 300 nanometers.

10. The membrane structure of claim 1, wherein the thickness of the microporous barrier layer is less than about 50 nanometers.

11. The membrane structure of claim 1, wherein the average pore size of pores in the microporous barrier layer is less than about 2 nanometers.

12. A composite gas separation module, comprising the membrane structure of claim 1.

13. A porous, tubular membrane structure, comprising:
    (I) a tubular, porous substrate having an inner surface and an outer surface;
    (II) a tubular, mesoporous, aluminum oxide layer which comprises a plurality of unconnected pores, having an inner surface and an outer surface, wherein the outer surface of the mesoporous aluminum oxide layer is in contact with the inner surface of the porous substrate; and (III) a thin, continuous, microporous barrier layer which comprises aluminum oxide, having an outer surface which contacts the inner surface of the mesoporous aluminum oxide layer; and an inner surface which defines a cavity; wherein fluid communication between the outer surface of the substrate and the cavity is capable of occurring through the substrate and layers II and III.

14. A membrane support, comprising at least one tubular membrane structure according to claim 13, extending through a length of the membrane support.

15. The membrane support of claim 14, in a substantially tubular shape, comprising a multitude of tubular membrane structures.

16. A gas separation module, comprising at least one membrane support according to claim 14, extending through a length of the module.

17. The gas separation module of claim 16, in a substantially tubular shape, comprising a multitude of membrane supports.

18. The gas separation module of claim 17, wherein the membrane supports are also in a substantially tubular shape.

19. A gas separation module, comprising at least one membrane structure according to claim 13, positioned within an enclosure to allow the structure to be exposed to a fluid stream containing hydrogen and other components, wherein the module is capable of allowing hydrogen to be preferentially transported across the membrane structure, thereby separating hydrogen from the other components.

20. A power plant, comprising
I) a gasification unit which converts carbonaceous fuel into synthesis gas;
II) a water-gas-shift reactor in flow-communication with the gasification unit, and configured to receive the synthesis gas, and to produce a gaseous product mixture comprising hydrogen and carbon dioxide;
III) a membrane unit in flow-communication with the water-gas-shift reactor; and capable of separating hydrogen from the gaseous product mixture; wherein the membrane unit includes at least one porous membrane structure which comprises:
 a) a porous substrate;
 b) a mesoporous, aluminum oxide layer disposed on the substrate, comprising a plurality of unconnected pores; and
 c) a thin, continuous, microporous barrier layer disposed on the mesoporous aluminum oxide layer, comprising aluminum oxide; and
IV) a power generation unit in communication with the membrane unit, so as to accept the hydrogen separated in the membrane unit as a fuel source, wherein the power generation unit is configured to produce electricity.

21. The power plant of claim 20, wherein the power generation unit is a combined cycle power generation unit.

22. A method for separating hydrogen from a fluid stream, comprising the step of contacting the fluid stream with a porous membrane structure, to preferentially transport hydrogen across the structure, wherein the membrane structure comprises:
 a) a porous substrate;
 b) a mesoporous, aluminum oxide layer disposed on the substrate, comprising a plurality of unconnected pores; and
 c) a thin, continuous, microporous barrier layer disposed on the mesoporous aluminum oxide layer, comprising aluminum oxide.

* * * * *